July 8, 1924. 1,500,448
V. C. GOODRIDGE
STORAGE BATTERY
Filed Jan. 23, 1922  2 Sheets-Sheet 1
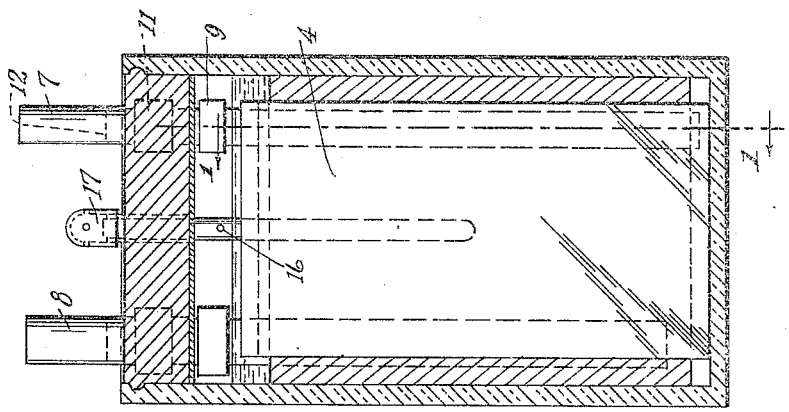
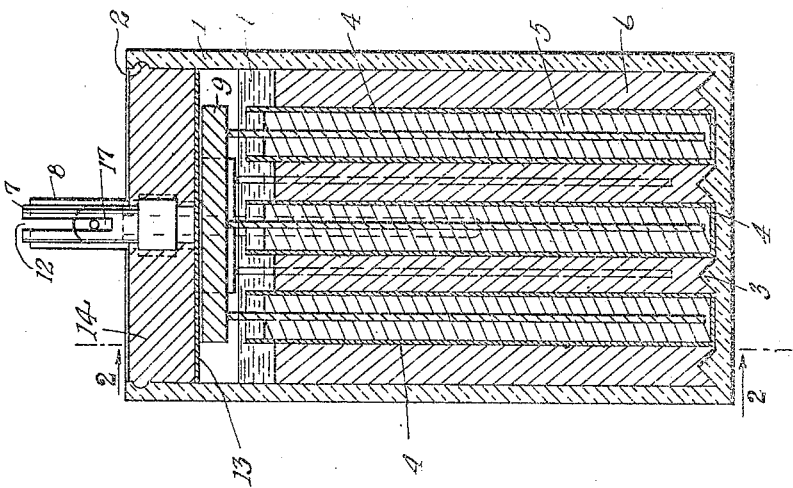
Witnesses:
Inventor
Victor Claude Goodridge
By Jno. A. Elliott
His Attorney

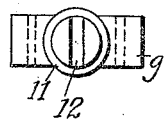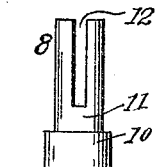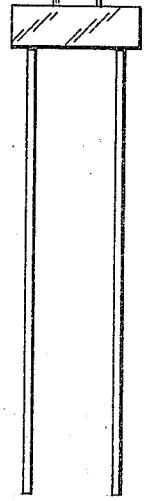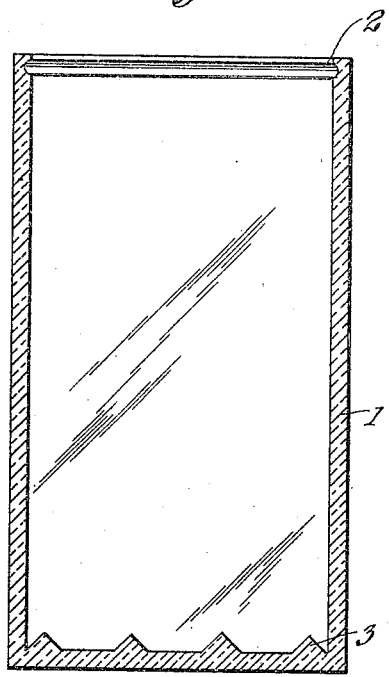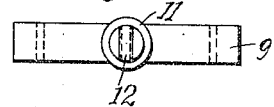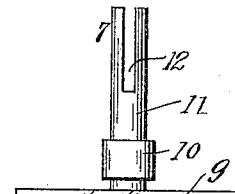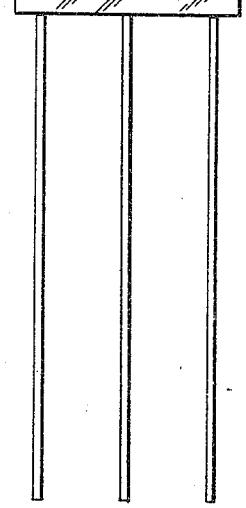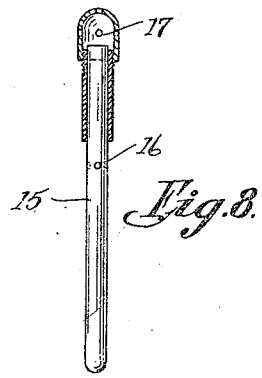

Patented July 8, 1924.

1,500,448

UNITED STATES PATENT OFFICE.

VICTOR CLAUDE GOODRIDGE, OF CHICAGO, ILLINOIS, ASSIGNOR TO GOODRIDGE BATTERY CO., A CORPORATION OF ILLINOIS

STORAGE BATTERY.

Application filed January 23, 1922. Serial No. 531,120.

*To all whom it may concern:*

Be it known that I, VICTOR CLAUDE GOODRIDGE, a citizen of the United States, and a resident of the city of Chicago, in the county of Cook and State of Illinois, have invented certain new and useful Improvements in Storage Batteries, of which the following is a specification.

This invention relates to improvements in storage batteries of the wet type, heretofore essentially consisting of skeleton plates forming grids or lattice-work, composed of lead or lead alloy, on the surfaces of some of which is an active positive material, and on others an active negative material previously deposited on said grids, which positive and negative plates are alternately arranged in and suspended a short distance above the bottom of a lead-lined battery box filled with sulphuric acid and respectively separated by wooden partitions rising from the bottom of the box, and of which plates all of the positive plates are connected together, as are also the negative plates.

The object of my invention broadly stated, is to produce a low resistance, non-sparking light and indestructible wet battery, which if the surplus electrolyte is poured out or evaporates is adapted to be successfully used as a dry battery.

More specifically stated, the invention is a battery, provided with containers adapted to enclose, separate and isolate without insulating one of the two active materials therein from the other.

A further object of my invention is the production of a wet battery, the construction of which is such that it is possible and practicable to apply the positive and negative active materials respectively, to the electrodes in their operative positions in a battery after the battery is completely and permanently assembled for use, and to dispense with the use of independent and costly lead-lined forming tanks and electric currents for making such deposits on the electrodes before their assemblage in a battery, and in so doing to thereby eliminate the possibility of producing plates so inferior as to be usable only in batteries which are seconds or are so inferior that they have to be scrapped.

A further object of my invention is to successfully prevent any disintegration of the plates in a battery, the breaking-up of any of the active materials and their dislodgment from the plates, either by the alternate contraction and expansion of the active material, due to charging, or discharging or to overcharging the battery or the buckling of the plates, especially in batteries used for automobile work, or under other conditions producing vibrations tending to quickly loosen and discharge the active materials from the plates and their deposit on the bottom of the battery box between the plates in quantities sufficient to effect a gradual shortening of the plates, short-circuit the electric current or reduce the normal capacity of the battery to deliver a stated number of ampere hours and thereafter finally render the battery useless.

A further object of my invention is to provide a wet battery which can suffer no injury from becoming dry and which cannot possibly spark between the plates when the electrolyte becomes low in the cell, which sparking is not infrequently the cause of disastrous explosions in mines or in any place where explosive gases are present; and also to provide a battery, the construction and operation of which are such that the constant attention heretofore required for keeping the plates covered with electrolyte is dispensed with in its entirety.

Another object of my invention is to substantially and materially reduce the amount of lead, the weight and cost of the construction of a battery to a minimum and at the same time increase its ampere hours to a maximum.

With these ends in view, my invention finds embodiment in certain features of novelty in the construction, combination and arrangement of parts by which the said objects and certain other objects are attained, all as hereinafter fully described with reference to the accompanying drawings and now particularly pointed out in the claims.

In said drawings,—

Fig. 1 is a sectional view of the invention on line 1—1 of Fig. 2.

Fig. 2 is a sectional vew of the invention on line 2—2 of Fig. 1.

Fig. 3 is a sectional view of the receptacle used in connection with the invention.

Fig. 4 is a top view of one form of electrode employed in connection with the invention.

Fig. 5 is a side elevation of such electrode.

Fig. 6 is a top view of another form of the electrode used in connection with the invention.

Fig. 7 is a side view of such electrode, and Fig. 8 is a view partly in section of the vent tube employed in connection with the invention.

In carrying out my invention, I may employ a receptacle 1 of any suitable material, preferably hard rubber, but may be of glass, provided with a groove 2, adjacent the upper edges thereof, which groove extends around the interior walls of the receptacle, said receptacle being also provided with spacing or holding members 3 preferably located in the bottom thereof, as shown in the drawing.

Disposed within the receptacle 1 are containers 4, such containers being of any suitable size and shape and of any suitable porous material, consisting of blotting paper or other suitable manufactured material, as distinguished from natural wood in which the pores might not freely communicate, which may be sealed by means of paraffin or any suitable sealing mixture preferably applied to opposite ends thereof.

The bottoms of the containers 4 are preferably disposed between the members 3, as shown in Fig. 1, for preventing their lateral movement within said receptacle, but any other suitable spacing means may be provided for locating the containers in their operative position in the receptacle.

Each of the containers 4 is filled with suitable positive electro-active material 5, and the receptacle with a suitable negative electro-active material 6, surrounding the containers 4.

Disposed at opposite sides of the battery are terminals 7 and 8, the terminal 7 being shown as having a plurality of legs, which may be round but are preferably flat or angular in cross-section, and which respectively correspond in number with their containers and are adapted to project into their containers and said electro-active material 5. The negative terminals 8 are similar to the positive terminals 7, except that the negative terminal 7 is preferably provided with either one less or one more leg than the positive terminal, all of the legs of both of which terminals are adapted to project into the electro-active material 6 surrounding the containers 4. The terminal 7 preferably has as many legs as there are containers within the receptacle, the arrangement being such that one of the terminals has its legs disposed within the containers, and the other terminal has its legs disposed between said containers.

The positive electro-active material 5 and the negative electro-active material 6 consist of plastic masses adapted to set and become substantially solid, thus firmly securing the containers and electrodes 7 and 8 in their operative position in the battery.

Electrolyte 6 is shown in the drawings covering the electro-active material, but such electrolyte may be removed if it is desired to use the battery in a dry condition, without impairing the efficiency of the battery.

The legs for each of the terminals are connected by a suitable bridge 9, upon which the terminals 7 and 8 are mounted and project outside of the battery. The terminals may be respectively provided with collars 10, 11, and slots 12.

As shown in Figs. 1 and 2, a cover 13 is adapted to rest on the bridges 9, and on the cover 13 is placed a plastic material 14, which surrounds the terminals.

The material 14 after hardening is held in position by the groove 2, as shown in Fig. 1, retaining the terminals securely in position by means of engagement with the collars 10 and 11, the slots 12 furnishing a convenient means for wiring to the terminals.

A vent tube 15 communicates with the interior of the battery and is provided with apertures 16 and a perforated cap 17, which tube may be filled with water and serves to dispense moisture to the battery, to exhaust gases therefrom, and to provide means for the insertion of a testing instrument when desired, which vent tube, however, may be omitted without a substantial departure from my invention.

For the construction of a battery in which my invention finds embodiment, the containers are first secured by any suitable means in their operative positions in the battery box therefor, as are also the electrodes and the vent tube, if one be used, the containers being already filled with red lead. The spaces between the containers and the battery box with litharge in the form of a hardening stiff paste by respectively mixing them with sulphuric acid, or any other material suitable therefor.

As shown in the drawings, the level of these filling materials is comparatively a short distance below the upper end of the containers, which level in the containers may be slightly above that in the adjacent spaces, but in practice both materials preferably have the same level throughout for uniformly sustaining their projecting ends against breaking down.

Following the natural hardening of these materials, the electrolyte is introduced until its level is just below the block 9 and thereafter the cover 14 is inserted and secured in its operative position, as shown in the drawings.

Having assembled the battery, as above described, it is then exposed to direct currents of electricity from any suitable source until all of the active material is converted and the battery is thereby in condition for use.

With the battery fully charged, and when for any reason it is desirable to use it as a dry battery, the electrolyte above the hardened materials is poured off by removing the cap 17, or else another cap closing a discharge opening suitable for that purpose, the quantity of the electrolyte remaining in the pores of the cups and of active materials being sufficient to insure the operation of the battery.

It is now to be observed that I am the first, so far as I am now aware, to provide a storage battery of the wet type with a container adapted to contact with enclose, separate and isolate one of the two active materials therein from the other.

My invention further includes and extends to any wet battery, wherein the containers for the electrodes and the space surrounding the containers are filled, for a substantial portion of their depth, respectively with active materials in a solid state, or wherein the materials are of sufficient solidity to rigidly maintain the containers of a battery in their operative position against the possibility of their bending or buckling in the slightest degree, and are so closely related with reference to the electrolyte therefor that the presence of but a limited amount of the electrolyte is necessary for the successful operation of the battery, and an amount so small that it may be quickly discharged therefrom to convert the battery into a dry battery that may be used as such, before resupplying the electrolyte. The term "solid," as herein employed, does not apply to electrode materials of comminuted form, the particles of which are capable of independent motions, but only to electrode materials in which the masses are substantially coherent throughout.

In short, my invention includes any storage battery which dispenses with grid-plate terminals, as heretofore employed, which battery is unaffected by its complete discharge; which will not spark between the terminals when in a partially discharged condition; which may be used in the same manner as dry and wet batteries have heretofore been used, and is not injured on becoming dry, and which, although containing less lead and being substantially lighter than heretofore, is so strongly and compactly made as to wholly resist disintegration by vibration or from rough handling.

While I have illustrated and described the preferred form of construction for carrying my invention into effect, it is capable of variation and modification without departing from the spirit of invention. I, therefore, do not wish to be limited to the precise details of the construction set forth, but desire to avail myself of such variations and modifications as come within the scope of the appended claims.

Having described my invention, what I claim and desire to secure by Letters Patent is:

1. A lead-lead battery, comprising in combination a receptacle, positive and negative active materials therein, and a container surrounding and adapted to enclose, separate and isolate one of said materials from the other, the receptacle, the active materials and the container being in sequential and physical contact.

2. A lead-lead battery, comprising in combination a receptacle, positive and negative active materials therein, and a container surrounding and adapted to enclose, separate and isolate one of said materials from the other, the positive material being in physical contact with the container and the receptacle.

3. A lead-lead battery, comprising in combination a receptacle, positive and negative active materials for said battery, and a container surrounding, separating and isolating one of said materials from the other, all in sequential contact the material of which container is adapted to provide a substantially free and unobstructed passage for an electric current through the electrolyte.

4. A lead-lead battery, comprising in combination a receptacle, substantially solid positive and negative active materials therein for said battery, and a container surrounding and adapted to separate but not insulate one of said materials from the other, the positive material being in physical contact with the container and the receptacle.

5. A storage battery, comprising in combination a receptacle, positive and negative active materials, a container for and in contact with the positive material and adapted to separate and isolate the positive material from the negative material and to provide a continuous space around said container for the negative active material.

6. A storage battery, comprising in combination a receptacle, positive and negative materials, and containers contacting with the positive material surrounding and adapted to separate and isolate one of said materials from the other and provide intercommunicating spaces for the negative active material, the material of which container is porous to receive the electrolyte to thereby admit of the passage of electric currents through the walls thereof.

7. A gridless storage battery, comprising in combination a receptacle, positive and negative materials contained therein, a container surrounding and adapted to separate and islolate one of said materials from the other, and a terminal provided with legs imbedded in said materials and respectively secured therein in their operative positions for a substantial portion of their length.

8. A storage battery, comprising a receptacle, a container having a closed bottom end disposed within said receptacle, solid electro-active material in and contacting with said container, and other solid electro-active material continuously surrounding said container.

9. A storage battery, comprising a receptacle, a porous container disposed within said receptacle, coherent mass of electro-active material in said container, and a continuous solid mass of other electro-active material surrounding said container and rigidly holding said container in its operative position.

10. A storage battery, comprising a receptacle, a porous container having a closed bottom and disposed within said receptacle, means for positioning said container in said receptacle, electro-active material in said container, and other electro-active material surrounding said container.

11. A storage battery, comprising a receptacle, a porous container disposed within said receptacle, a substantially solid mass of electro-active material in said container, a continuous mass of other electro-active material surrounding said container, and electrolyte covering the electro-active material in said container and surrounding the same.

12. A gridless lead-lead storage battery, comprising a receptacle, a porous container disposed within said receptacle, a mass of electro-active material in said container, a substantially solid mass of electro-active material continuously surrounding said container, and terminal legs disposed, one within the material in said container, and the other within the material surrounding said container.

13. A storage battery, comprising a receptacle, a groove extending about the inner surface thereof, porous containers in said receptacle, electro-active material in said containers, other electro-active material continuously surrounding said containers, a lid for said receptacle, and a sealing compound spread on said lid and engaging said groove.

14. A gridless storage battery, comprising a receptacle, a groove extending about the inner surface of said receptacle, porous containers in said receptacle, electro-active material in said containers, other electro-active material surrounding said containers, terminal legs engaging said electro-active material in said receptacle and said containers, and a sealing compound engaging said groove and said electrodes for holding same in position.

15. A gridless storage battery, comprising a receptacle, containers in said receptacle, electro-active material in said containers, other electro-active material surrounding said containers, terminal legs engaging said electro-active material in said receptacle and said containers, collars on said terminals, and a sealing compound engaging said collars and said receptacle to hold same in position.

16. A gridless storage battery, comprising a receptacle, containers in said receptacle, masses of electro-active material in said containers, a substantially solid mass of other electro-active material surrounding said containers, terminal legs one of which legs is held in said containers by the material therein, and the other of which is held between the containers by the material surrounding the same, and a sealing compound engaging said terminal legs and said receptacle to hold same in position.

17. A gridless storage battery, comprising a receptacle, a plurality of containers in said receptacle, electro-active material in said containers, and other electro-active material continuously surrounding said containers, a terminal having members engaging the material in said containers, and another terminal having its members engaging between said containers.

18. A gridless storage battery, comprising a receptacle, a plurality of containers in said receptacle, electro-active material in said containers, and other electro-active material continuously surrounding said containers, forked terminals one of which has its legs projecting into said containers and the other of which has its legs projecting between said containers.

19. A storage battery, comprising a receptacle, porous containers disposed within said receptacle, a substantially solid mass of electro-active material in said containers, a substantially solid mass of other electro-active material surrounding said containers, terminal legs one of which is disposed within said containers and the other of which is disposed between said containers, means for sealing said battery, and a vent tube communicating with the interior of said battery and having means for exhausting gases therefrom and supplying moisture thereto.

20. A lead-lead battery, including segregated masses of active material, a continuous mass of active material common to all of said segregated masses, and an electrolyte.

21. A gridless lead battery in which normally conductive active materials constitute the main path for the current.

22. A lead battery having all of its solid elements fashioned into an non-comminuted integral whole.

23. A lead battery containing a continuous porous electrode, another electrode embedded in said continuous electrode, an electrolyte permeating said electrodes, and terminals for said electrodes, each of said electrodes being integral and formed of non-comminuted material.

24. A lead battery having a single porous negative element, a plurality of porous positive elements, an intervening partition, and an electrolyte filling the pores of said elements.

25. A lead battery containing segregated porous electrodes, a continuous porous electrode in which said electrodes are embedded, an electrolyte permeating said electrodes, and terminals for said electrodes.

In witness whereof, I have hereunto set my hand and affixed my seal, this 21st day of January, 1922.

VICTOR CLAUDE GOODRIDGE. [L. S.]